(12) United States Patent
Usukura et al.

(10) Patent No.: US 8,049,607 B2
(45) Date of Patent: Nov. 1, 2011

(54) OIL LEVEL DETECTING DEVICE

(75) Inventors: Yasutaka Usukura, Saitama (JP);
Masahiko Tsuchiya, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 472 days.

(21) Appl. No.: 12/361,063

(22) Filed: Jan. 28, 2009

(65) Prior Publication Data

US 2009/0195374 A1    Aug. 6, 2009

(30) Foreign Application Priority Data

Jan. 31, 2008   (JP) .................................. 2008-021330

(51) Int. Cl.
*B60Q 1/00*   (2006.01)

(52) U.S. Cl. .................. 340/450.3; 340/450; 340/425.5
(58) Field of Classification Search ................ 340/450.3
See application file for complete search history.

(56) References Cited

U.S. PATENT DOCUMENTS 3,846,747 A * 11/1974 Arai et al. ................... 340/450.3
3,927,390 A * 12/1975 Hill .............................. 340/451
4,321,590 A    3/1982 Ishikawa et al.

FOREIGN PATENT DOCUMENTS

| JP | 5-66523 U | 9/1993 |
|---|---|---|
| WO | WO 92/04605 A1 | 3/1992 |
| WO | WO 2006/137507 A2 | 12/2006 |

* cited by examiner

*Primary Examiner* — George Bugg
*Assistant Examiner* — Kerri McNally
(74) *Attorney, Agent, or Firm* — Birch, Stewart, Kolasch & Birch, LLP (57) ABSTRACT

To determine a failure of a float switch for detecting whether or not the oil level is less than or equal to a predetermined oil level. A predetermined oil level OLth is set between a normal oil level and a minimum oil level in view of the fact that when the oil level in an oil pan is normal, the oil level is decreased from the normal oil level to the minimum oil level during a predetermined time period just after starting an engine. When a float switch is not changed from an OFF position to an ON position during the predetermined time period after starting the engine, it is determined that the float switch suffers a failure or the oil level is excessive.

20 Claims, 7 Drawing Sheets

| RO | 200 Ω ±5% |
|---|---|
| RL | 100 Ω ±5% |
| RS | 40 Ω ±5% |
| RX | 0.3 ~ 100 Ω (BEFORE ENDURANCE TEST - AFTER ENDURANCE TEST) |

FIG.3

|  |  | OIL LEVEL | 42 (62.50) | VAD |
|---|---|---|---|---|
| NORMAL |  | LOW | ON | $\dfrac{VB \times RS}{RL+RS+\left(\dfrac{RO \times RX}{RO+RX}\right)}$ |
|  |  | HI | OFF | $\dfrac{VB \times RS}{RO+RL+RS}$ |
| ABNORMAL | BREAK AT POINT A | LOW | ON | 0 |
|  |  | HI | OFF | 0 |
|  | GND SHORT AT POINT A | LOW | ON | 0 |
|  |  | HI | OFF | 0 |
|  | BREAK AT POINT B | LOW | ON | 0 |
|  |  | HI | OFF | 0 |
|  | GND SHORT AT POINT B | LOW | ON | 0 |
|  |  | HI | OFF | 0 |

FIG.4

| VARIATION | 42 (62) ON/OFF | RO Ω | RX Ω | RA Ω | RL Ω | RS Ω | VB V | IS mA | VAD V | VAD |
|---|---|---|---|---|---|---|---|---|---|---|
| NO | ON | 200 | 0.3 | 0.30 | 100 | 40 | 12 | 85.5 | 3.42 | |
| | OFF | 200 | ∞ | 200 | 100 | 40 | 12 | 35.3 | 1.41 | |
| VADmax | ON | 190 | 0.3 | 0.30 | 95 | 42 | 12 | 87.4 | 3.67 | |
| | OFF | 190 | ∞ | 190 | 95 | 42 | 12 | 36.7 | 1.54 | VADoffmax |
| VADmin | ON | 210 | 100 | 67.7 | 105 | 38 | 12 | 56.9 | 2.16 | VADonmin |
| | OFF | 210 | ∞ | 210 | 105 | 38 | 12 | 34.0 | 1.29 | |

OIL LEVEL DETECTING DEVICE

CROSS-REFERENCE TO RELATED APPLICATIONS

The present application claims priority under 35 USC 119 to Japanese Patent Application No. 2008-021330 filed on Jan. 31, 2008 the entire contents of which are hereby incorporated by reference.

FIELD OF THE INVENTION

The present invention relates to a vehicular oil level detecting device for detecting an oil level in an oil reservoir and giving a warning or the like according to the result of this detection. More particularly, to such a vehicular oil level detecting device suitable for use in a motorcycle or the like.

DESCRIPTION OF BACKGROUND ART

A vehicular oil level detecting device is known wherein a detection level is set between an oil level at the time of turning on an ignition switch and an oil level at the time of starting an engine in view of the fact that the oil level in an oil reservoir is decreased at the time of the starting of the engine. In addition, an oil level switch is adapted to be operated when the oil level is less than or equal to the detection level mentioned above. The oil level switch is provided in the oil reservoir. See, for example, Japanese Utility Model Laid-open No. Hei 5-66523 (FIG. 4).

In the technique described in Japanese Utility Model Laid-open No. Hei 5-66523, when the oil level switch has already been operated (OFF position as defined in Japanese Utility Model Laid-open No. Hei 5-66523) at the time of turning on the ignition switch, an oil warning lamp is turned on.

However, the conventional vehicular oil level detecting device mentioned above has a problem such that when the oil level switch suffers an open position failure (i.e., the OFF position is always held), improper determination may be made in such a manner that the oil level is improperly determined to be normal in spite of the lack of oil in the oil reservoir.

SUMMARY AND OBJECTS OF THE INVENTION

It is accordingly an object of an embodiment of the present invention to provide a vehicular oil level detecting device which can detect the possibility of a failure of an oil level switch.

In accordance with an embodiment of the present invention, there is provided a vehicular oil level detecting device for detecting an oil level in an oil reservoir and giving a warning according to the result of this detection. A predetermined oil level is set between a normal oil level and a minimum oil level in view of the fact that when the oil level in the oil reservoir is normal, the oil level is decreased from the normal oil level to the minimum oil level during a predetermined time period just after starting an engine and the vehicular oil level detecting device includes an oil level switch provided in the oil reservoir and adapted to be operated when the oil level is less than or equal to the predetermined oil level. A determining means is provided for determining that the oil level switch suffers a failure or the oil level is excessive when the oil level switch is not operated during the predetermined time period after the time of starting the engine.

According to an embodiment of the present invention, when the oil level switch is not operated (opened or closed) during the predetermined time period after the time of starting the engine, it is determined that the oil level switch suffers a failure or the oil level is excessive. Accordingly, it is possible to avoid an improper determination such that the oil level is improperly determined to be normal in spite of the lack of the oil level (e.g., the oil level is improperly indicated as a normal oil level).

Preferably, the oil level switch is provided by a float switch. For example, the float switch is provided in the oil reservoir so that when the oil level in the oil reservoir is greater than the predetermined oil level, the float switch is in an OFF position, whereas when the oil level is less than or equal to the predetermined oil level, the float switch is in an ON position. When the float switch is not changed from the OFF position to the ON position during the predetermined time period after the time of starting the engine, the determining means determines that the float switch suffers a failure or the oil level is excessive.

More preferably a resistance is connected to the oil level switch (float switch) in parallel. In this case, even though the oil level switch (float switch) is deteriorated, for example, even though a contact resistance in the oil level switch is changed with time, the determining means can accurately detect the operation (opening or closing operation) of the oil level switch (float switch).

According to an embodiment of the present invention, it is possible to avoid an improper determination such that the oil level is improperly determined to be normal in spite of the lack of oil in the oil reservoir (e.g., the oil level is improperly indicated as a normal oil level).

According to an embodiment of the present invention, a failure of the oil level switch can be detected with almost no change in hardware configuration of the oil level detecting device, but with a mere change in software.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

A preferred embodiment of the present invention will now be described with reference to the drawings.

Figure 1:
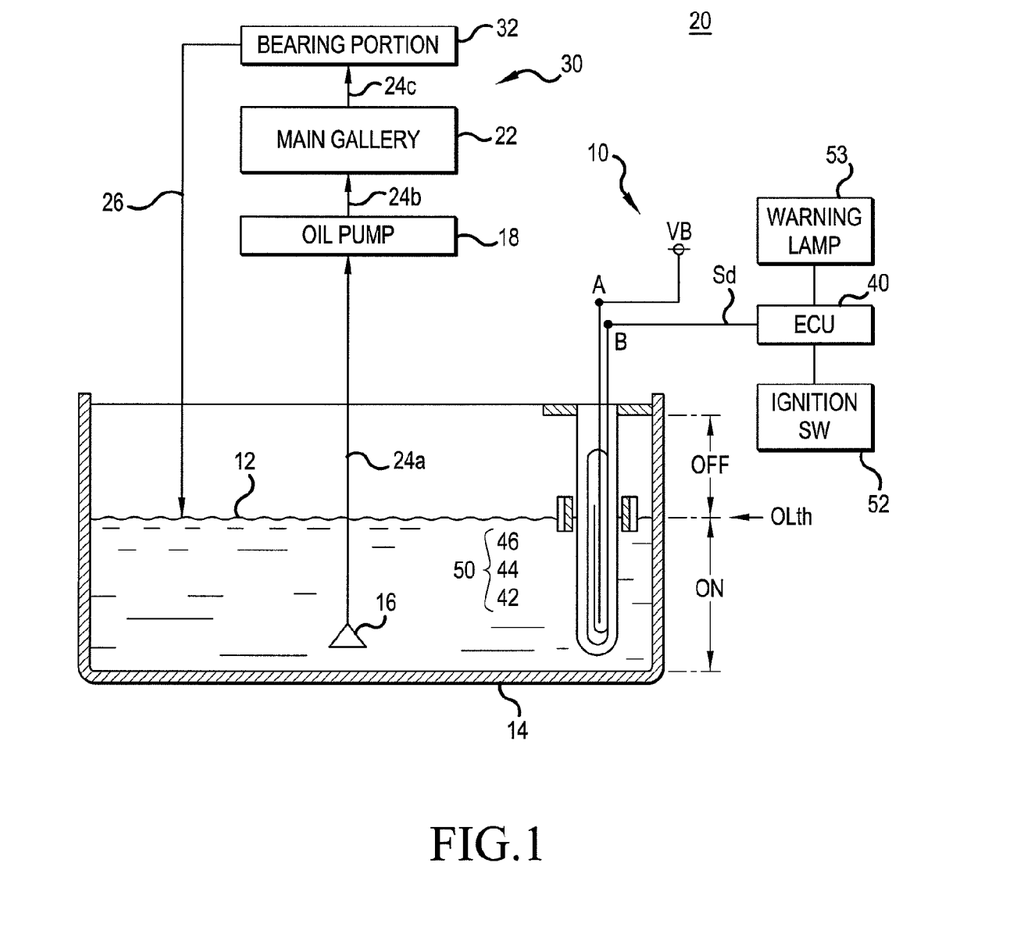
FIG. 1 is a schematic diagram showing the configuration of a vehicular oil lubrication system incorporating an oil level detecting device according to a preferred embodiment of the present invention.

FIG. 1 shows a schematic configuration of a vehicular oil lubrication system 20 incorporating an oil level detecting device 10 according to a preferred embodiment of the present invention. In this preferred embodiment, the vehicular oil lubrication system 20 is mounted on a motorcycle. Unlike a four-wheel vehicle, it is preferable in a motorcycle that an oil level can be measured prior to operation just after starting an engine. This is due to the fact that in a motorcycle unlike a four-wheel vehicle it is difficult to detect an oil level because of the swinging of the vehicle body during operation.

The vehicular oil lubrication system 20 shown in FIG. 1 is composed generally of an oil circulation system 30 and the oil level detecting device 10 for detecting whether or not the oil level OL of the oil 12 circulating in the oil circulation system 30 is normal.

The oil circulation system 30 includes the oil 12, an oil pan 14 (oil reservoir) for storing the oil 12, a strainer 16, an oil pump 18 adapted to be rotationally driven by the rotation of a main shaft (not shown), a main gallery 22, communication passages 24$a$, 24$b$, and 24$c$ for the oil 12, and a drop passage (drop space) 26 for the oil 12. The oil 12 is pumped up by the oil pump 18 through the strainer 16 and supplied to the main gallery 22. The oil 12 is further supplied from the main gallery 22 to a bearing portion 32 including bearings for a camshaft, connecting rod, main shaft, etc. After lubrication of the bearing portion 32, the oil 12 is returned through the drop passage 26 to the oil pan 14.

On the other hand, the oil level detecting device 10 is composed generally of a float switch 50 (oil level switch) and an ECU (electronic control unit) 40 as determining means. The float switch 50 includes a reed switch 42, a resin stem 44 fixedly containing the reed switch 42, and a float 46 having a magnet provided around the stem 44 so as to be vertically moved according to the oil level OL of the oil 12.

The float switch 50 is provided so as to output a detection signal Sd which is turned OFF when the oil level of the oil 12 in the oil pan 14 is greater than a predetermined oil level OLth (the oil level is HI), and is turned ON when the oil level is less than or equal to the predetermined oil level OLth (the oil level is LO). The detection signal Sd output from the float switch 50 is supplied to the ECU 40.

In the case wherein the oil 12 is stored in an oil reserve tank (not shown), the float switch 50 is provided in the oil reserve tank.

An ignition switch 52 and a warning lamp 53 as an indicating device are connected to the ECU 40.

Figure 2:
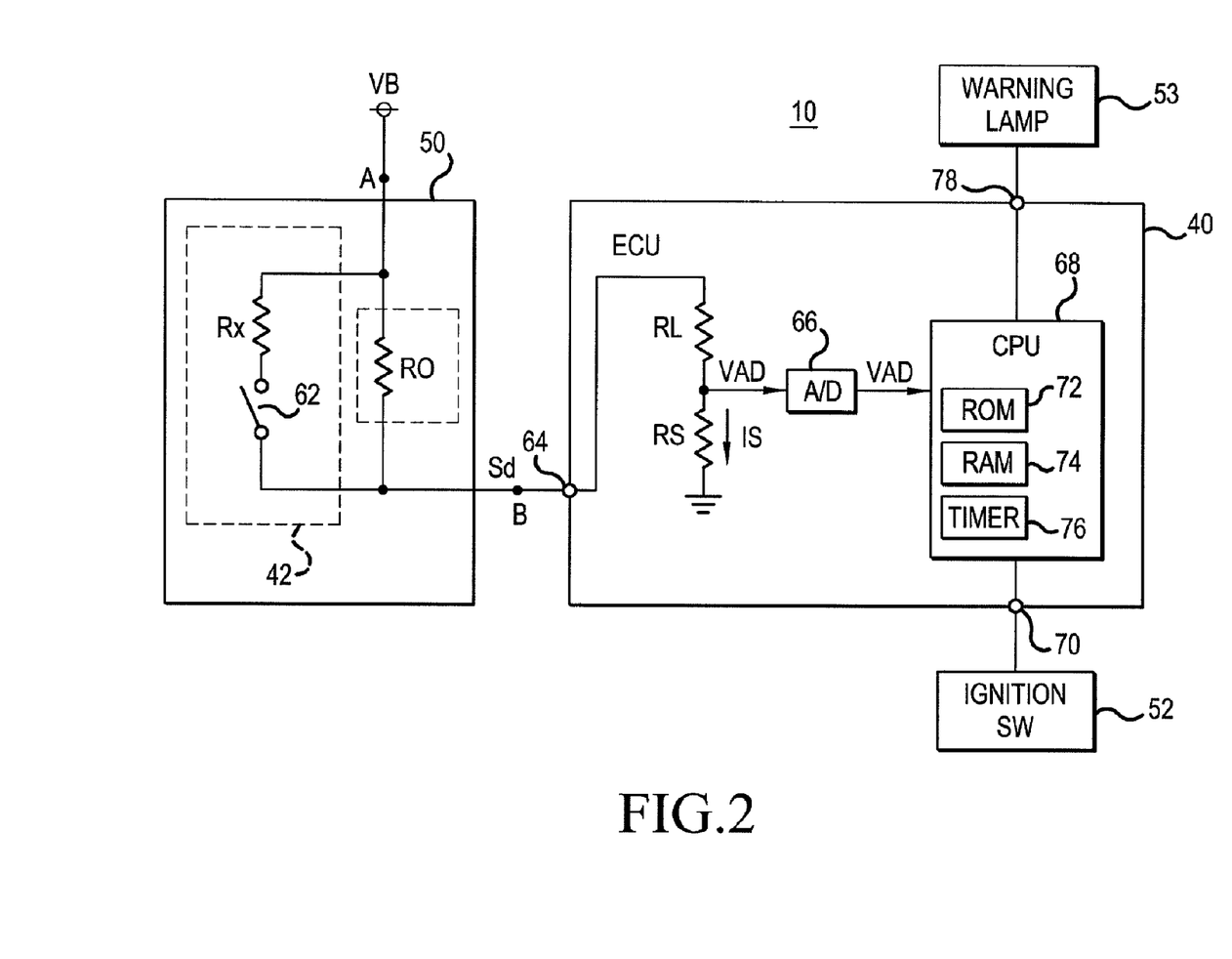
FIG. 2 is a detailed circuit diagram of the oil level detecting device shown in FIG. 1.

FIG. 2 is an electric circuit diagram of the oil level detecting device 10.

As shown in FIG. 2, the float switch 50 has such a configuration that a resistance R0 is connected to the reed switch 42 in parallel. The reed switch 42 is configured by a series circuit composed of an ideal switch 62 having a resistance value of 0 and a contact resistance RX changing with time.

One end of the float switch 50 is connected through wiring shown by a point A to a DC power supply (voltage) VB, and the other end of the float switch 50 is connected through wiring shown by a point B and a port 64 to a resistance voltage divider circuit composed of voltage dividing resistances RL and RS connected in series. One end of the resistance (shunt resistance) RS is grounded.

A detection voltage VAD generated across the resistance RS is input through an A/D converter 66 into a CPU 68.

The ignition switch 52 is connected through a port 70 to the CPU 68, and the warning lamp 53 is connected through a port 78 to the CPU 68.

The CPU 68 has a ROM 72, a RAM 74, and a timer (time measuring means) 76. The CPU 68 operates also as function realizing means for realizing various functions by executing programs stored in the ROM 72 according to various inputs.

Figure 3:
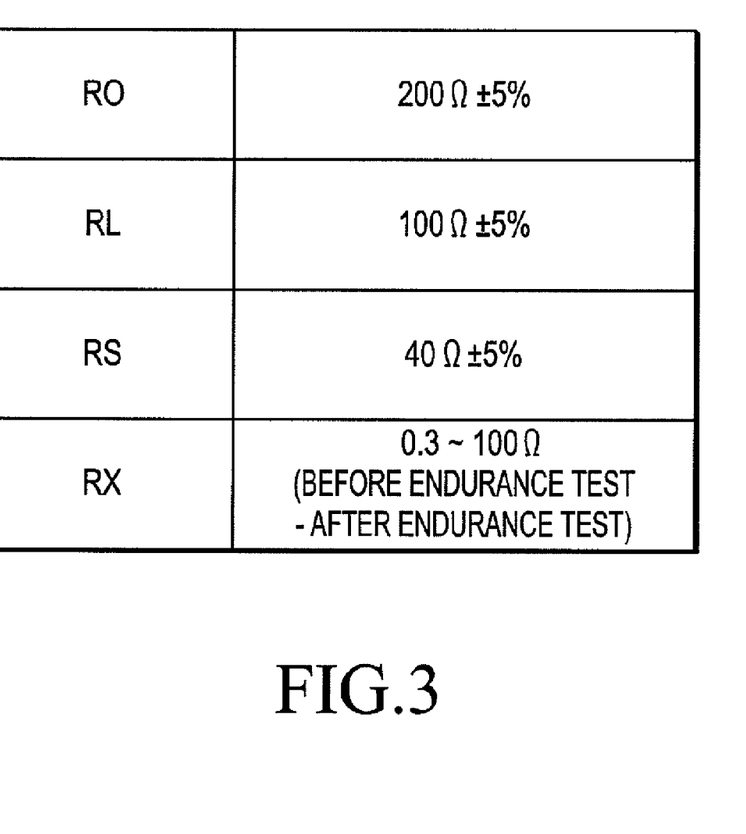
FIG. 3 is a table showing an example of the values for resistances provided in the oil level detecting device shown in FIG. 2.

FIG. 3 shows an example of the values for the resistances R0, RL, RS, and RX. As shown in FIG. 3, R0=200Ω±5%, RL=100Ω±5%, RS=200Ω±5%, and the contact resistance RX varies between 0.3Ω as an initial value (before an endurance test) and 100Ω as a value after the endurance test (after aging).

As shown in FIG. 1, when the float 46 has a vertical position corresponding to an oil level (oil level HI) greater than or equal to the predetermined oil level OLth, the reed switch 42 is turned OFF (open). At this time, the detection voltage VAD is given by VADoff=VB×RS/(RL+RS+R0). Conversely, when the float 46 has a vertical position corresponding to an oil level (oil level LO) less than or equal to the predetermined oil level OLth, the reed switch 42 becomes ON (closed). At this time, the detection voltage VAD is given by VADon=VB× RS/[RL+RS+{(R0×RX)/(R0+RX)}] (where, VADon>VADoff).

Figure 4:
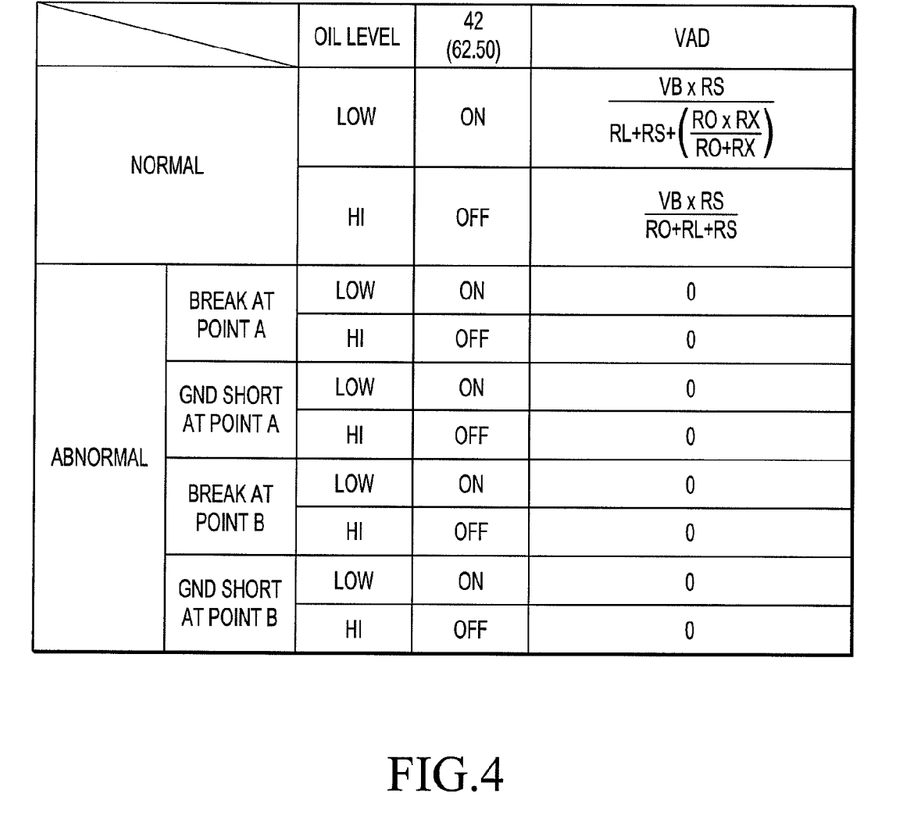
FIG. 4 is a table showing the equations for detection voltages in the normal and abnormal conditions of the oil level detecting device shown in FIG. 2.

FIG. 4 shows the equations for the detection voltages VAD in the ON and OFF positions of the reed switch 42 (the float switch 50 or the ideal switch 62) in the case of abnormality including a break at the point A, a GND short at the point A (short circuit to the ground), a break at the point B, and a GND short at the point B and in the case of normality excluding these abnormalities.

Figure 5:
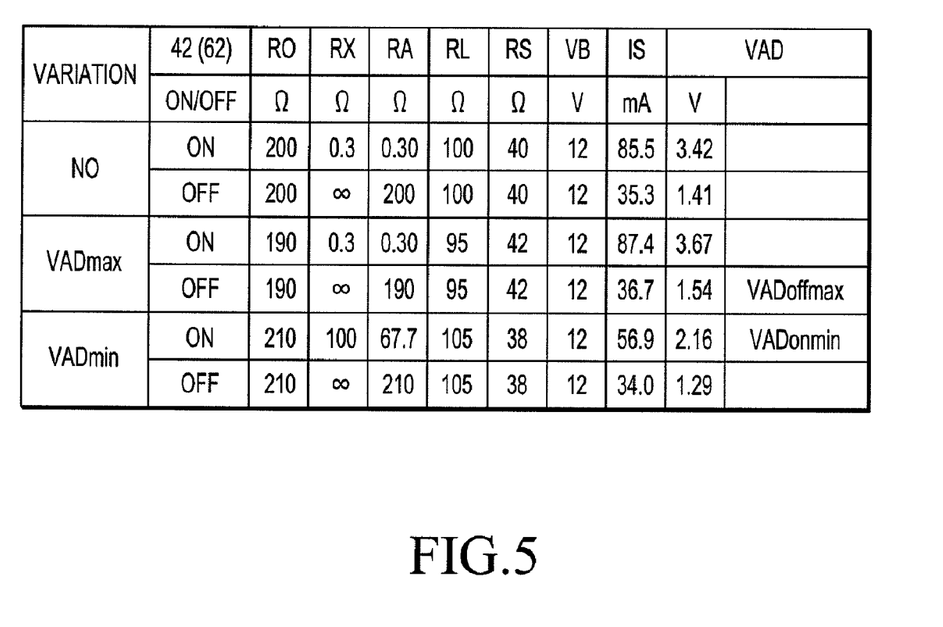
FIG. 5 is a table showing the values for the detection voltage in the case of considering a variation in each resistance provided in the oil level detecting device.

FIG. 5 is a table showing the values for the resistances R0, RX, RA, RL, and RS, the values for a current IS flowing in the resistance RS, and the values for the detection voltage VAD in the ON and OFF positions of the reed switch 42 in the case that there is a variation in the resistances R0, RL, RS, and RX shown in FIG. 3 when the float switch 50 is normal as shown in FIG. 4, in the case that the detection voltage VAD becomes maximum due to such a variation, and in the case that the detection voltage VAD becomes minimum.

The detection voltage VAD is calculated as VAD=RS×IS, and the current IS is calculated as IS=VB/(RL+RA+RS), where RA represents a combined parallel resistance of the parallel resistance R0 and the contact resistance RX. That is, RA (R0×RX)/(R0+RX).

As is apparent from FIG. 5, in the case wherein a variation in accuracy of the resistances R0, RL, and RS and an aged deterioration of the contact resistance RX are taken into consideration, the minimum value for the detection voltage VAD in the ON position of the reed switch 42 is given by VADonmin=2.16 V, and the maximum value for the detection voltage VAD in the OFF position of the reed switch 42 is given by VADoffmax=1.54 V. Thus, there is a sufficient difference between the minimum detection voltage VADonmin in the ON position of the reed switch 42 and the maximum detection voltage VADoffmax in the OFF position of the reed switch 42 as Δ=VADonmin−VADoffmax=0.62 V. Accordingly, the ON position or OFF position of the reed switch 42 (the float switch 50) can be reliably detected. Such reliable detection is effected by the parallel resistance R0 provided to reduce the influence of the aged deterioration of the contact resistance RX upon the detection voltage VAD.

In this case, a threshold voltage Vth to be used in determining whether the reed switch 42 is in the ON position or in the OFF position from the detection voltage VAD is decided as the central value between the minimum detection voltage VADonmin and the maximum detection voltage VADoffmax.

In the example shown in FIG. 5, the threshold voltage Vth is decided as Vth=VADoffmax+{(VADonmin−VADoffmax)/2}=1.54+{(2.16−1.54)/2}=1.85 V. This value is preliminarily stored in the ROM 72. Accordingly, even when there is a variation in each resistance, the CPU 68 can determine whether the float switch 50 (the reed switch 42 or the ideal switch 62) is in the ON position or in the OFF position from the detection voltage VAD.

Only by a very simple change in hardware such that the resistance R0 is connected to the reed switch 42 in parallel as shown in FIG. 2, the ON or OFF position of the reed switch 42 can be reliably determined (detected) from the detection voltage VAD by the ECU 40 operating at a supply voltage of 5 V irrespective of an aged deterioration of the resistance RX.

When the detection voltage VAD is greater than the threshold voltage Vth (VAD>Vth), the ON position of the float switch 50 (the reed switch 42 or the ideal switch 62) can be determined, whereas when the detection voltage VAD is less than the threshold voltage Vth (VAD<Vth), the OFF position of the float switch 50 (the reed switch 42 or the ideal switch 62) can be determined.

Figure 6:
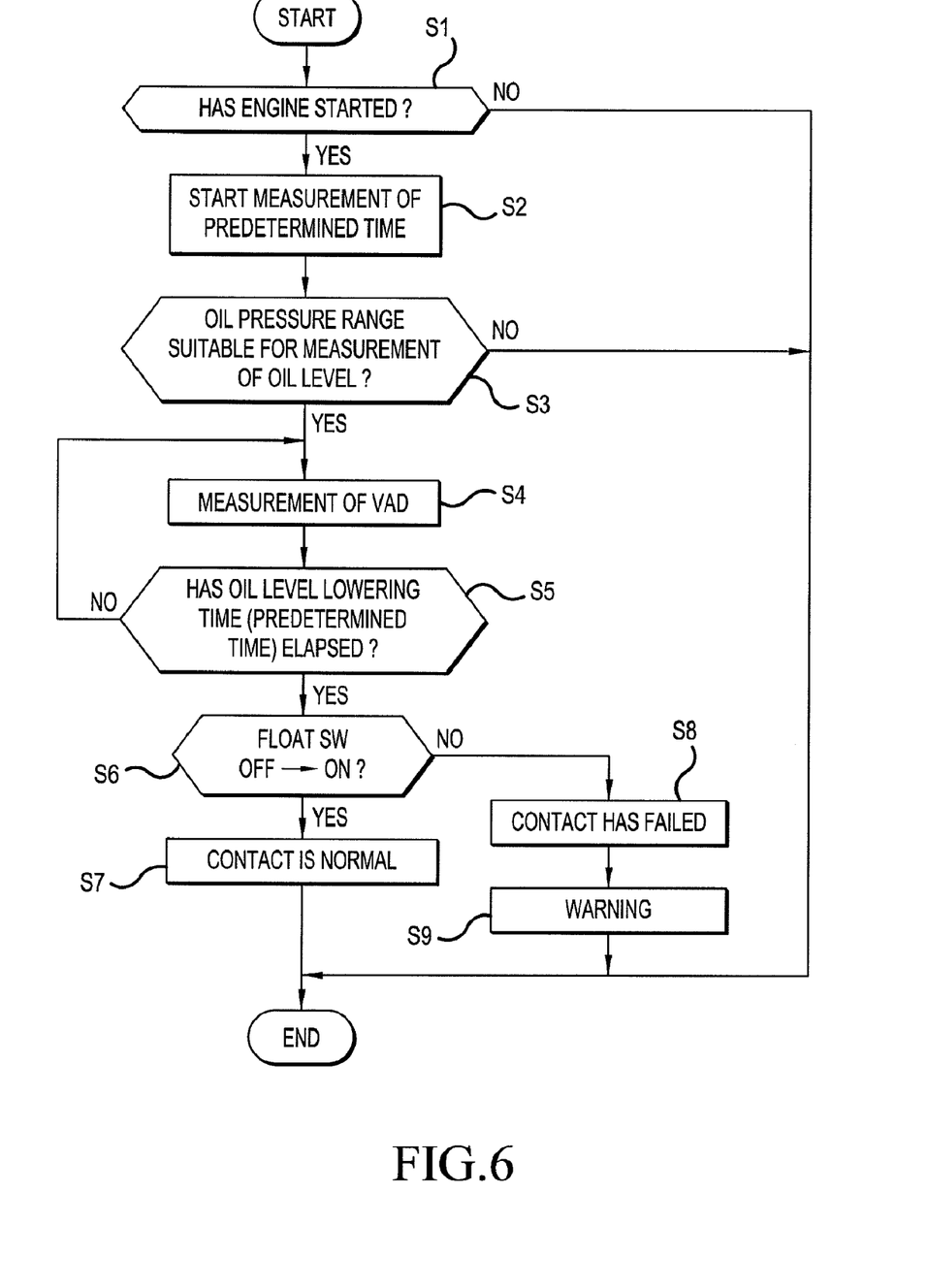
FIG. 6 is a flowchart for illustrating the operation of the oil level detecting device.

The operation of the vehicular oil lubrication system 20 which is basically composed of the oil circulation system 30 and the oil level detecting device 10 as mentioned above will now be described with reference to the flowchart shown in FIG. 6.

In step S1, the CPU 68 (ECU 40) determines whether or not the ignition switch 52 has been turned on to start the engine from a crank pulse output from a crank pulse generator provided near a crankshaft (not shown), for example.

When the start of the engine is detected, the program proceeds to step S2. In step S2, the CPU 68 starts the measurement of a predetermined time period Tth (which will be hereinafter be described) from the time of starting the engine by using the own timer 76 (time measuring means).

In step S3, it is determined whether or not the oil temperature is in a temperature range (e.g., −40° C. to +35° C.) suitable for the measurement of the oil level.

If the oil temperature is in the above temperature range suitable for the measurement of the oil level, the program proceeds to step S4 to measure the detection voltage VAD. Thereafter, in step S5, it is determined whether or not an oil level lowering time period equal to the predetermined time period Tth has elapsed. In this case, a log of the measurement of the detection voltage VAD is kept every very short elapsed time. e.g., 5 ms, and it is stored into the RAM 74 of the CPU 68 as a table showing the correspondence between the elapsed time period from the engine start time and the detection voltage VAD measured.

Figure 7:
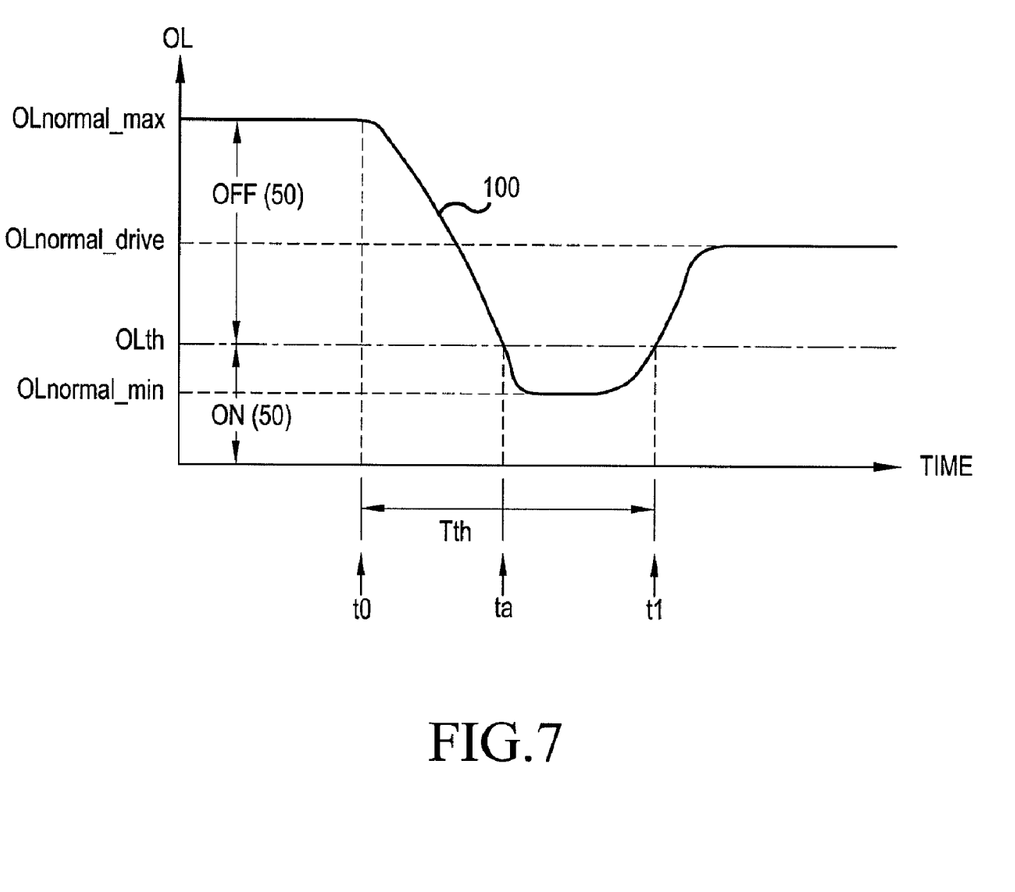
FIG. 7 is a graph for illustrating the decision of a predetermined oil level.

FIG. 7 shows a characteristic 100 of schematic change in oil level OL after starting the engine in the case that the oil level is normal.

When the engine is started at the time to, the oil pump 18 is operated to pump up the oil 12 from the oil pan 14 through the strainer 16 to the main gallery 22 and to further supply the oil 12 from the main gallery 22 to the bearing portion 32 for a camshaft, crankshaft, etc. Accordingly, at the starting of the engine, the oil level OL is rapidly decreased from a starting oil level OLnormal_max to a minimum oil level OLnormal_min. Thereafter, the oil 12 lubricates the bearing portion 32 to scatter and drop back to the oil pan 14. Accordingly, the oil level OL is increased up to a certain stable level (which will be hereinafter referred to as driving oil level OLnormal_drive) as shown in FIG. 7. Thereafter, this stable level OLnormal_drive is maintained to keep lubricating the bearing portion 32 with the oil 12.

In this preferred embodiment, the predetermined time period (oil level lowering time period) Tth is set to 18 seconds as measured with the motorcycle including the vehicular oil lubrication system 20.

When the oil level is normal, the float switch 50 (the reed switch 42 or the ideal switch 62) is always changed from the OFF position to the ON position at the time ta after the engine starting time to during the predetermined time period Tth. As mentioned above, the float switch 50 is located so that it becomes ON at the predetermined oil level OLth (see also FIG. 1).

Referring back to FIG. 6, it is determined in step S6 whether or not the float switch 50 is changed from the OFF position to the ON position during the predetermined time period Tth ranging from the time t0 to the time t1 by referring to the result of the measurement of the detection voltage VAD in step S4 (i.e., the above-mentioned log stored in the RAM 74, or the table showing the correspondence between the elapsed time period from the engine starting time t0 and the detection voltage VAD measured).

In the case wherein a detection voltage VAD greater than the threshold voltage Vth is detected for a given time period (e.g., 18 seconds) or more, i.e., in the case that the ON position of the float switch 50 is detected for this given time period or more in step S6, the program proceeds to step S7 to determine that the contact of the float switch 50 (the reed switch 42 or the ideal switch 62) is normal (the oil level is normal).

Conversely, in the case that the detection voltage VAD greater than the threshold voltage Vth cannot be detected for the given time period or more in step S6, the program proceeds to step S8 to determine that the contact of the float switch 50 (the reed switch 42 or the ideal switch 62) suffers a failure or the oil level is excessive. Thereafter, the program proceeds to step S9 to give a warning through the warning lamp 53. For example, this warning is indicated in a meter mounted on the motorcycle.

As described above, the oil level detecting device 10 detects the oil level OL in the oil pan 14 and gives a warning through the warning lamp 53 according to the result of this detection. More specifically, when the oil level OL in the oil pan 14 is normal, the oil level OL decreases from the starting oil level OLnormal_max to the minimum oil level OLnormal_min during the predetermined time period Tth just after starting the engine. In view of this change in the oil level, the predetermined oil level OLth is set between the starting oil level OLnormal_max and the minimum oil level OLnormal_min.

The oil level detecting device 10 includes the float switch 50 provided in the oil pan 14 for outputting the detection signal Sd when the oil level OL is less than or equal to the predetermined oil level OLth and the ECU 40 as the determining means for determining that the float switch 50 suffers a failure or the oil level OL is excessive when the detection signal Sd is not output from the float switch 50 during the predetermined time period Tth after the engine starting time to, i.e., when the detection voltage VAD does not exceed the threshold voltage Vth during the predetermined time period Tth.

According to this determination, it is possible to avoid improper determination such that the oil level OL is improperly determined to be normal in spite of the lack of the oil level (e.g., the oil level OL is improperly indicated as a normal oil level).

The predetermined oil level OLth is set preferably between the driving oil level OLnormal_drive and the minimum oil level OLnormal_min, more preferably, in the vicinity of the central value therebetween.

Further, according to this preferred embodiment, by only connecting the resistance R0 to the reed switch 42 constituting the float switch 50 in parallel (the resistance R0 may be connected between the point A and the point B shown in FIG. 2), i.e., by only slight addition of hardware, the failure of the float switch 50 (open or closed position failure) can be reliably detected by processing with software.

It should be noted that the present invention is not limited to the above preferred embodiment, but various modifications may be made within the scope of the present invention. For example, the float switch 50 using the reed switch 42 may be replaced by a level detecting switch including a case, a rodlike guide provided on the case, a float vertically movably provided in the case so as to be loosely fitted in the rodlike guide, an electrode plate mounted on the bottom surface of the float, and a pair of terminals provided at the bottom inside the case so as to extend across the guide, wherein the electrode plate mounted on the float lowering in concert with lowering of a level comes into contact with the terminals, so that the terminals become conductive to thereby detect that the level becomes a predetermined level or less.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicular oil level detecting device for detecting an oil level in an oil reservoir and giving a warning according to the result of this detection, comprising:
a predetermined oil level is set between a normal oil level and a minimum oil level in view of the fact that when the oil level in said oil reservoir is normal, the oil level is decreased from said normal oil level to said minimum oil level during a predetermined time period just after starting an engine; and
said vehicular oil level detecting device comprises:
an oil level switch provided in said oil reservoir and adapted to be operated when the oil level is less than or equal to said predetermined oil level; and
determining means for determining that said oil level switch suffers a failure or the oil level is excessive when said oil level switch is not operated during said predetermined time period after the time of starting said engine.

2. The vehicular oil level detecting device according to claim 1, wherein:
said oil level switch includes a float switch; and
said determining means determines that said float switch suffers a failure or the oil level is excessive when said float switch is not operated during said predetermined time period after the time of starting said engine.

3. The vehicular oil level detecting device according to claim 1, further comprising a resistance connected to said oil level switch in parallel, wherein:
a parallel circuit of said resistance and said oil level switch is connected to a power supply;
one end of a resistance voltage divider circuit is connected to said parallel circuit in series, whereas the other end of said resistance voltage divider circuit is grounded; and
said determining means performs the determination according to a voltage generated across a grounded resistance of said resistance voltage divider circuit.

4. The vehicular oil level detecting device according to claim 2, further comprising a resistance connected to said oil level switch in parallel, wherein:
a parallel circuit of said resistance and said oil level switch is connected to a power supply;
one end of a resistance voltage divider circuit is connected to said parallel circuit in series, whereas the other end of said resistance voltage divider circuit is grounded; and
said determining means performs the determination according to a voltage generated across a grounded resistance of said resistance voltage divider circuit.

5. The vehicular oil level detecting device according to claim 2, wherein a first end of the float switch is adapted to be connected to a power supply whereas a second end is connected to a resistance voltage divider circuit including at least two voltage dividing resistances connected in series with one end of one of the at least two voltage dividing resistances being grounded.

6. The vehicular oil level detecting device according to claim 5, wherein a detected voltage is supplied to a converter to said determining means.

7. The vehicular oil level detecting device according to claim 5, wherein the float switch includes a float having a vertical position corresponding to the oil level and a reed switch, wherein when the float has a vertical position less than or equal to the predetermined oil level, the reed switch is ON and a first predetermined voltage is supplied to the resistance voltage divider circuit.

8. The vehicular oil level detecting device according to claim 7, wherein when the reed switch is OFF a second predetermined voltage is supplied to the resistance voltage divider circuit.

9. The vehicular oil level detecting device according to claim 8, wherein a threshold voltage used to determine if the reed switch is ON is determined by the following formula:

$$Vth = VADoffmax + \{(VADonmin - VADoffmax)/2\}$$

wherein Vth is the threshold voltage
VADoffmax is the maximum detection voltage
VADonmin is the minimum detection voltage.

10. The vehicular oil level detecting device according to claim 9, wherein when the detection voltage is greater than the threshold voltage the reed switch is ON and wherein the detection voltage is less than the threshold voltage the reed switch is OFF.

11. A vehicular oil level detecting device for detecting an oil level in an oil reservoir and giving a warning according to the result of this detection, comprising:
a predetermined oil level is set between a normal oil level and a minimum oil level in said oil reservoir wherein the oil level is decreased from said normal oil level to said minimum oil level during a predetermined time period just after starting an engine; and
an oil level switch operatively provided in said oil reservoir for determining when the oil level is less than or equal to said predetermined oil level; and
determining means operatively connected to the oil level switch for determining that said oil level switch is inoperative or the oil level is excessive when said oil level switch is not operated during said predetermined time period after the time of starting said engine.

12. The vehicular oil level detecting device according to claim 11, wherein:
   said oil level switch includes a float switch; and
   said determining means determines that said float switch is inoperative or the oil level is excessive when said float switch is not operated during said predetermined time period after the time of starting said engine.

13. The vehicular oil level detecting device according to claim 11, further comprising a resistance connected to said oil level switch in parallel, wherein:
   a parallel circuit of said resistance and said oil level switch is connected to a power supply;
   one end of a resistance voltage divider circuit is connected to said parallel circuit in series, whereas the other end of said resistance voltage divider circuit is grounded; and
   said determining means performs the determination according to a voltage generated across a grounded resistance of said resistance voltage divider circuit.

14. The vehicular oil level detecting device according to claim 12, further comprising a resistance connected to said oil level switch in parallel, wherein:
   a parallel circuit of said resistance and said oil level switch is connected to a power supply;
   one end of a resistance voltage divider circuit is connected to said parallel circuit in series, whereas the other end of said resistance voltage divider circuit is grounded; and
   said determining means performs the determination according to a voltage generated across a grounded resistance of said resistance voltage divider circuit.

15. The vehicular oil level detecting device according to claim 12, wherein a first end of the float switch is adapted to be connected to a power supply whereas a second end is connected to a resistance voltage divider circuit including at least two voltage dividing resistances connected in series with one end of one of the at least two voltage dividing resistances being grounded.

16. The vehicular oil level detecting device according to claim 15, wherein a detected voltage is supplied to a converter to said determining means.

17. The vehicular oil level detecting device according to claim 15, wherein the float switch includes a float having a vertical position corresponding to the oil level and a reed switch, wherein when the float has a vertical position less than or equal to the predetermined oil level, the reed switch is ON and a first predetermined voltage is supplied to the resistance voltage divider circuit.

18. The vehicular oil level detecting device according to claim 17, wherein when the reed switch is OFF a second predetermined voltage is supplied to the resistance voltage divider circuit.

19. The vehicular oil level detecting device according to claim 18, wherein a threshold voltage used to determine if the reed switch is ON is determined by the following formula:

$$Vth = VADoffmax + \{(VADonmin - VADoffmax)/2\}$$

wherein Vth is the threshold voltage
VADoffmax is the maximum detection voltage
VADonmin is the minimum detection voltage.

20. The vehicular oil level detecting device according to claim 19, wherein when the detection voltage is greater than the threshold voltage the reed switch is ON and wherein the detection voltage is less than the threshold voltage the reed switch is OFF.

* * * * *